US008880475B2

(12) United States Patent
Olson (10) Patent No.: US 8,880,475 B2
(45) Date of Patent: Nov. 4, 2014

(54) REUSING SNAPSHOTS IN A NETWORK DATA MANAGEMENT PROTOCOL BACKUP OPERATION

(75) Inventor: John T. Olson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 13/082,438

(22) Filed: Apr. 8, 2011

(65) Prior Publication Data
US 2012/0259815 A1     Oct. 11, 2012

(51) Int. Cl.
G06F 17/30     (2006.01)
G06F 11/14     (2006.01)

(52) U.S. Cl.
CPC ........ G06F 11/1458 (2013.01); *G06F 2201/84* (2013.01)
USPC ........................................ 707/649

(58) Field of Classification Search
None
See application file for complete search history.

(56) References Cited

U.S. PATENT DOCUMENTS

| | | | |
|---|---|---|---|
| 6,823,336 B1 | 11/2004 | Srinivasan et al. | |
| 6,934,822 B2 | 8/2005 | Armangau et al. | |
| 7,240,171 B2 | 7/2007 | Barton et al. | |
| 7,506,116 B2 | 3/2009 | Haselton et al. | |
| 7,523,278 B2 | 4/2009 | Thompson et al. | |
| 7,549,028 B2 | 6/2009 | Thompson et al. | |
| 7,680,836 B2 | 3/2010 | Anderson et al. | |
| 7,716,185 B2 | 5/2010 | Thompson et al. | |
| 7,966,293 B1* | 6/2011 | Owara et al. | 707/654 |
| 2001/0044807 A1* | 11/2001 | Kleiman et al. | 707/203 |
| 2007/0136381 A1 | 6/2007 | Cannon et al. | |
| 2007/0204120 A1* | 8/2007 | Garimella et al. | 711/162 |
| 2010/0115334 A1* | 5/2010 | Malleck et al. | 714/15 |
| 2010/0274764 A1 | 10/2010 | Boyd et al. | |

OTHER PUBLICATIONS

"HP OpenView Storage Data Protector", Concepts Guide, Jul. 2006, pp. 1-130.
"Method and System for Performing Simultaneous Network Data Management Protocol (NDMP) Backups for Scale Out Network Attached Storage (SONAS) Appliance", www.ip.com, IPCOM000199563D, Sep. 9, 2010, 7 pages.
"NDMP Plugin", Application Notes for Isilon IQ Cluster NAS Device, BakBone, Sep. 29, 2008, 18 pages.

* cited by examiner

*Primary Examiner* — Dinku Gebresenbet
(74) *Attorney, Agent, or Firm* — Francis Lammes; Stephen J. Walder, Jr.; Randall J. Bluestone (57) ABSTRACT

Mechanisms, in a data processing system, are provided for performing a data management operation. These mechanisms identify one or more defined groups of data elements that are a target of the data management operation. One or more previously generated snapshot files associated with the one or more defined groups are identified and a determination is made as to whether at least one previously generated snapshot file of the one or more previously generated snapshot files associated with the one or more defined groups is able to be reused when performing the data management operation. The data management operation is performed based on the determination of whether at least one previously generated snapshot file of the one or more previously generated snapshot files associated with the one or more defined groups is able to be reused when performing the data management operation.

25 Claims, 5 Drawing Sheets

REUSING SNAPSHOTS IN A NETWORK DATA MANAGEMENT PROTOCOL BACKUP OPERATION

BACKGROUND

The present application relates generally to an improved data processing apparatus and method and more specifically to mechanisms for reusing snapshots in a network data management protocol (NDMP) backup operation.

NDMP is an open standard protocol for network-based backup for network-attached storage. The protocol allows backup and network-attached file server vendors to focus investment on functionality instead of excessive porting, and gives users an unprecedented level of choice and interoperability. The purpose of the NDMP protocol is to allow a network based data management application, such as a data backup application, to control the backup and retrieval of data in an NDMP-compliant storage environment without installing third-party software on the storage devices themselves.

In NDMP the control and data transfer components of the data management operation are separated. This separation allows for complete interoperability at a network level. The storage system vendors need only be concerned with maintaining compatibility with one, well-defined protocol. The data management vendors can place their primary focus on the sophisticated central data management administration software.

The NDMP protocol is targeted towards the process of data management: backup, restore, replication, mirroring, etc. The protocol is specifically intended to support tape drives. However, the protocol can be used for other applications and support other media as well. More information about NDMP, including the standard specifications, may be found at the NDMP official website www.ndmp.org The most recent version of NDMP, i.e. NDMP v5, provides support for snapshots. A snapshot is a mechanism for quickly creating and labeling a consistent copy of a volume or a file system. In other words, the snapshot represents the state of the volume or file system at a particular instance in time. Many separately labeled snapshots can co-exist on a storage device at a same time and can be used as input to a backup or data replication operation. In NDMP v5, support for snapshots, which are used by many vendors of database systems, is provided such that the data management application (DMA) engine can issue commands to have a data service create and label snapshots so that they can be later used as the source for a data management operation, such as a backup operation or data replication operation.

Currently, with NDMP, snapshots are taken with regard to every directory of a file system or volume. In large file systems, such as file systems with millions of small files, the overhead to take a snapshot or delete a snapshot can reduce the overall bandwidth of the backup and increase the time it takes to backup a file system.

SUMMARY

In one illustrative embodiment, a method, in a data processing system, is provided for performing a data management operation. The method comprises identifying, by the data processing system, one or more defined groups of data elements that are a target of the data management operation. The method further comprises identifying, by the data processing system, one or more previously generated snapshot files associated with the one or more defined groups. Moreover, the method comprises determining, by the data processing system, whether at least one previously generated snapshot file of the one or more previously generated snapshot files associated with the one or more defined groups is able to be reused when performing the data management operation. In addition, the method comprises performing, by the data processing system, the data management operation based on the determination of whether at least one previously generated snapshot file of the one or more previously generated snapshot files associated with the one or more defined groups is able to be reused when performing the data management operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for reusing snapshots in a network data management protocol (NDMP) backup operation. That is, the illustrative embodiments provide users with an ability to use existing snapshots for backup operations, replication operations, or other data management operations rather than having to generate a new snapshot with each operation. This reduces overall bandwidth requirements and the time it takes to perform data management operations. Moreover, the mechanisms of the illustrative embodiments allow users to choose expiration times for snapshots so that old snapshots can be automatically deleted and not reused in order to make sure that out of date snapshots are not reused for performing the data management operations.

With the mechanisms of the illustrative embodiments, a user may specify, through environment variables, groups of directories to be backed up that should utilize the same snapshot when possible. The user may further specify, through other environment variables associated with the group environment variables, an expiration time of the snapshot group so that the user can control how often a new snapshot is to be created. While a snapshot is still valid, i.e. it has not expired, the snapshot remains available for use in performing future data management operations even after the current data management operation has been completed. The specified groups of directories are linked to the corresponding snapshot so that when a future data management operation is performed that includes the specified group of directories, at least a portion of the data management operation corresponding to the specified group of directories is performed using an existing snapshot that has not yet expired.

In one illustrative embodiment, two new environment variables are provided. An environment variable, in the context of this illustrative embodiment, is a variable that is a type of "global" variable that is bound to a specific backup instance and defines at least a portion of the environment of the backup. If this environment variable is not included with the specific backup instance, then the directories that are backed up are backed up without this particular environment variable defined.

With this illustrative embodiment, the first new environmental variable is the backup group name (BACKUP_GROUP_NAME) environmental variable that specifies a unique name for the group of directories that are to be treated as a unit with regard to snapshot reuse. The second new environmental variable is the backup group expiration (BACKUP_GROUP_EXPIRATION) environmental variable that specifies a time period for which snapshots generated for the backup group associated with the backup group expiration are valid. For most backup software, the placement of these environmental variable definitions will determine which directories being backed up will be affected by the environment variable values. For example, if the environment variables are defined at the top of a list of directories to be backed up, all directories in the backup policy having a placement after the environment variable definitions will be treated as being in the corresponding backup group with the associated backup group expiration. If a new set of backup group and backup group expiration time environment variables are specified thereafter, then the new set of backup group and backup group expiration time environment variables will supersede the previous set of environment variables for directories having a placement thereafter.

In one illustrative embodiment, because of the highly parallel nature of large scale network attached storage systems, the backup groups and their associated expiration values are assigned on a per filesystem basis rather than on a per computing device or machine basis. This means that hundreds of backup data streams associated with several computing devices or machines interfaced to a single file system can utilize the same backup group. This parallelization allows the user to scale their backup streams based on their network capabilities and not be limited by having to create separate snapshots for each computing device or machine interfacing with the file system.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
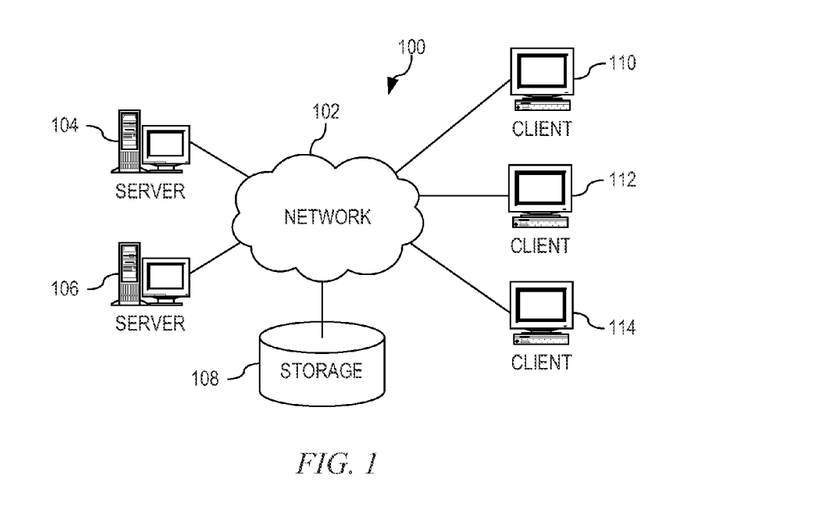
FIG. 1 is an example diagram of an example distributed data processing system in which aspects of the illustrative embodiments may be implemented.
Figure 2:
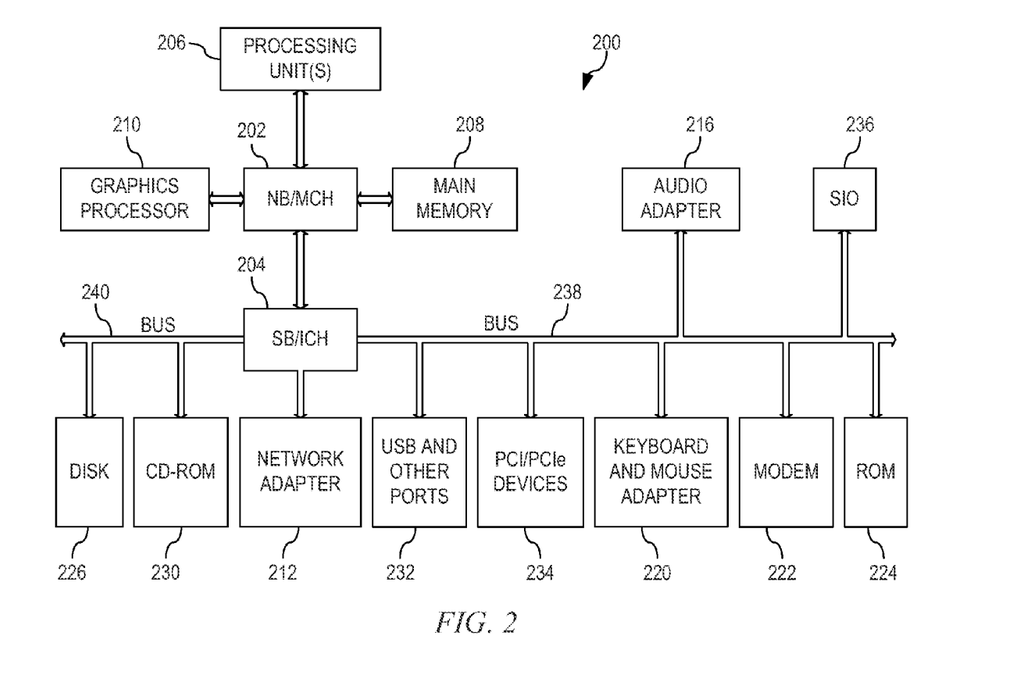
FIG. 2 is an example block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network attached storage system 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, the network attached storage system 108 in FIG. 1 may provide one or more file systems that may be shared by one or more computing devices, such as servers 104, 106 and/or clients 110-114. Moreover, the network attached storage system 108 may implement a data management system that in turn implements the snapshot reuse mechanisms of the illustrative embodiments. That is, the network attached storage system 108 may have an associated computing device comprising one or more processors, one or more memories, and the like, that may execute instructions to perform operations for managing data in the network attached storage system 108 including performing backup operations or data replication operations using the snapshot reuse mechanisms described hereafter. Alternatively, the mechanisms of the illustrative embodiments may be implemented remotely via one or more data networks, such as by one or more of servers 104 and 106, for example.

With the mechanisms of the illustrative embodiments, the computing device designates groups of directories within a file system or volume of the network attached storage system 108. The groups have associated expiration time variables that specify how long a snapshot associated with the group is valid. When a snapshot is generated, such as in response to the initialization of a data management operation (e.g., a backup operation or data replication operation) by one of the servers 104 or 106, or one of the client devices 110-114, the snapshot is stored in association with the group name and the expiration time variables. The snapshot is kept for future use with future data management operations initiated by one or more of the computing devices, e.g., servers 104-106 or clients 110-114. When the snapshot expires, the snapshot is automatically deleted such that a next data management operation will cause a new snapshot of the group being generated.

Figure 3:
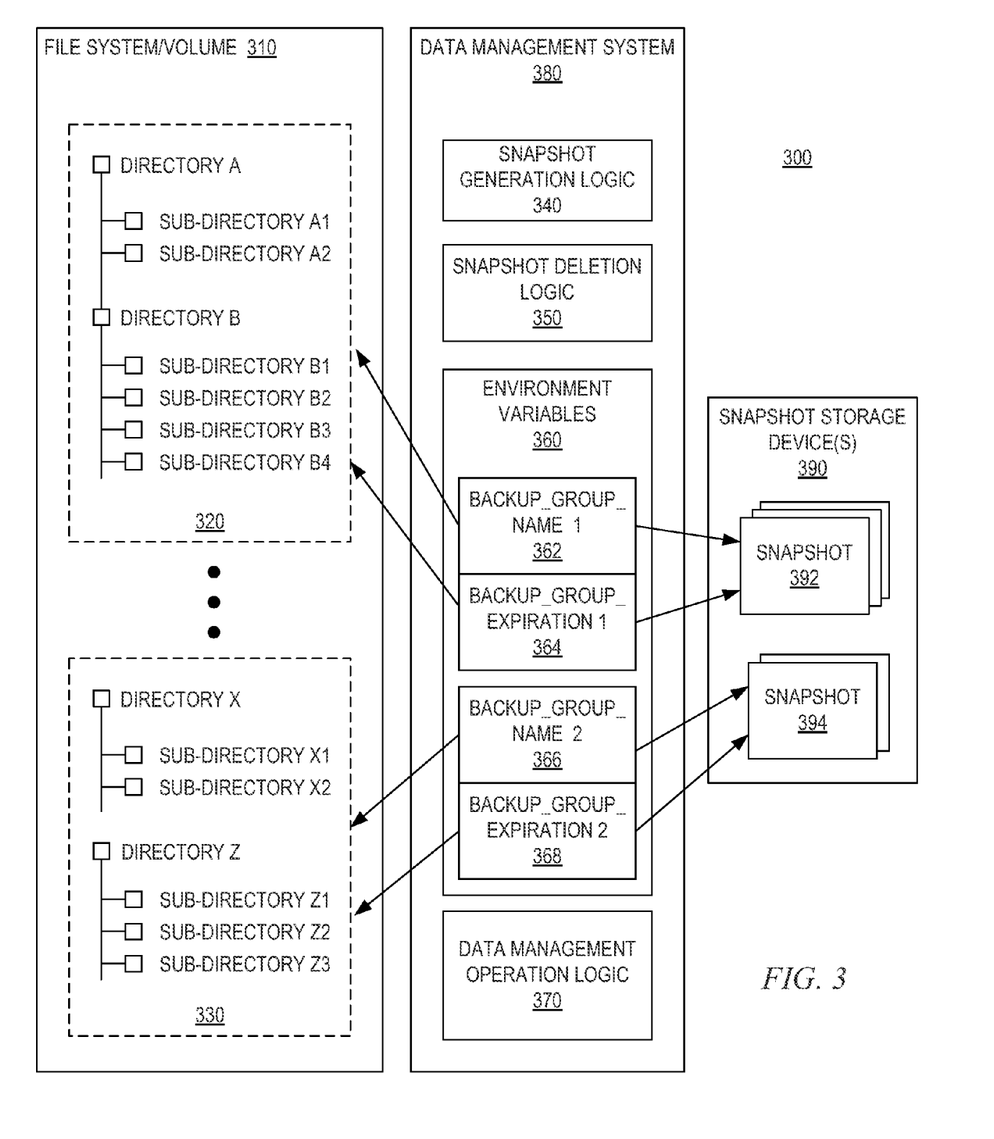
FIG. 3 is an example block diagram of the primary operational elements of a data management system implementing the snapshot mechanisms of the illustrative embodiments.

FIG. 3 is an example block diagram of the primary operational elements of a data management system implementing the snapshot mechanisms of the illustrative embodiments. The elements shown in FIG. 3 may be implemented in hardware, software, or any combination of hardware and software. In one illustrative embodiment, the mechanism of FIG. 3 may be implemented as software instructions executed by one or more processors of one or more data processing or computing systems. The software instructions may be loaded into one or more memories associated with the one or more processors so that they may then be retrieved from these one or more memories and executed by the one or more processors to cause functionality in accordance with the description herein to be made possible.

The illustrative embodiments may be applied to various data management operations including a backup operation, data replication operation, or the like. For purposes of the following description, it will be assumed that the data management operation is a backup operation for ease of explanation. Thus, reference will be made hereafter to backup operations, backup groups, backup expiration times, and the like. It should be appreciated that while reference is made to "backup" elements, these elements and the mechanisms of the illustrative embodiments are not limited to backup operations and can be applied to any data management operation described herein, those that are otherwise known to those of ordinary skill in the art, or that may be later developed.

As shown in FIG. 3, the network attached storage system 300 may comprise one or more file systems and/or volumes 310. These file systems and/or volumes 310 may comprise a plurality of files and/or data sets that are organized into directories, sub-directories, and the like. In accordance with the illustrative embodiments, various ones of these directories and/or subdirectories may be grouped into logical groupings 320 and 330. Various criteria may be used for determining which directories and/or subdirectories are to be included in the same logical groupings 320 and 330. In one example, the directories and subdirectories that are part of the same logical groupings 320 and 330 may be selected based on a backup window size and throughput of the system. That is, a backup window, i.e. a window in time when a backup can occur, may be defined along with associated requirements, such as an overall minimum throughput, e.g., amount of data per second that is to be used during the backup window to perform a backup operation. Based on this information, directories and subdirectories may be grouped into logical groups 320 and 330 so that the size of the logical groupings 320 and 330 are such that the logical grouping 320 and 330 may be backed up in parallel within the defined backup window. Of course, other criteria for selecting which directories and subdirectories to include in the various logical groupings 320 and 33 may be used without departing from the spirit and scope of the illustrative embodiments.

In order to designate the logical groupings 320 and 330, the data management system 380 associated with the network attached storage system 300, which in the example illustrative embodiment implements a Network Data Management Protocol (NDMP) system, stores environment variables 360 that include, among other environment variables, a backup group name and expiration variable value for each designated group. The backup group name environment variable specifies a unique name for a group of directories and sub-directories of the file system and/or volume 310. The backup group expiration environment variable specifies an expiration time for the corresponding group of directories and sub-directories of the file system and/or volume 310.

For example, the backup group name 1 environment variable 362 provides a unique backup group name for the group of directories and sub-directories 320. The backup group expiration 1 environment variable 364 provides an expiration time for snapshots generated on directories or sub-directories of the group 320. For example, the backup group expiration 1 environment variable 364 may specify that snapshots may be valid for 1 hour, 12 hours, a day, a week, or any other smaller or greater time period.

The expiration time environment variables are used, when the data management operation logic 370 performs a data management operation, such as in response to a request from a server computing device, client computing device, or the like, to determine whether to reuse an already existing snapshot for one or more directories and/or sub-directories that are the subject of the data management operation. The snapshots 392, 394 themselves may be stored in one or more snapshot storage devices 390 of the network attached storage system 300. The backup group name environment variables designate the groups 320 and 330, and further link the groups 320 and 330 to corresponding snap shots 392, 394. The group expiration time environment variables 362, 364 are associated with corresponding ones of the backup group names and, thereby are associated with the corresponding groups 320, 330 and snapshots 392, 394.

The backup group name environment variables 362, 366 and the backup group expiration environment variables 364, 368 may be associated with the directories and sub-directories of the groups 320 and 330 with which they are associated in any of a number of different ways, e.g., through pointers, configuration files, parameters passed with the start-up of data management daemons, configuration values entered into backup policy definitions, or the like. In one illustrative embodiment, the association of the environment variables 360 with the various directories/subdirectories to which they correspond is made possible by the particular placement of the environment variables in the file system or volume 310 in relation to the directories/sub-directories. For example, the environment variable definitions that are to be associated with a set of directories/sub-directories may be placed at a beginning of a list of directories and sub-directories of the file system/volume 310 and will be applicable to all directories and sub-directories occurring in the list after the environment variable definitions until another set of environment variable definitions is placed in a subsequent position within the list at which point the second set of environment variable definitions supersede the previous set of environment variable definitions.

For example, the backup group name and backup group expiration 362, 365 may be placed just prior to directory A in the list such that the backup group name and expiration 362, 365 applies to all directories and sub-directories appearing after these environment variables 362, 364 until another set of environment variables 366, 368 are encountered in the list. The backup group name and backup group expiration 366, 368 may be placed just prior to the entry for directory X in the list. As a result, the environment variables 366, 368 are applied to directory X and subsequent directories/sub-directories until another set of environment variables specifying a group name and group expiration time are encountered, if any.

The backup group name and backup group expiration time environment variables 362-368 may further be associated with snapshots 392-394 stored in the snapshot storage device(s) 390. For example, this association may be made by naming the snapshots 392-394 as a combination of the associated backup group name and backup group expiration time. In operation, when a request to perform a data management operation, e.g., a backup operation, data replication operation, or the like, is received from another storage device, e.g., a client computing device, server computing device, or the like, or the data management operation is initiated by the network attached storage system itself, the particular directories and sub-directories that are a subject of the data management operation are identified. The backup group, or groups, associated with the directories/sub-directories are identified along with their associated backup group expiration times, if any. Based on the backup group name, one or more associated snapshots 392, 394 are identified.

For example, in one illustrative embodiment, the environment variables above the list of directories/sub-directories to be backed-up are passed by the data management system 380 to a NDMP DataServer of the network attached storage system 300 with every directory that is to be backed up to the network attached storage system 300. Therefore, these environment variables are associated with each NDMP session because they are passed with each NDMP session as parameters to a call of the NDMP DataServer such that one parameter is the directory name and each environment variable is another parameter in the call.

The snapshots 392, 394 may have associated timestamps specifying a time when the snapshot 392, 394 was created. Based on the timestamps of the snapshots 392, 394, and the backup group expiration time environment variables 364, 368 associated with the backup group names 362, 366 which are associated with the snapshots 392, 394, a determination is made as to whether there are already stored any snapshots 392, 394 that are still valid, i.e. have not yet expired, that may be reused when performing the data management operation. If so, then rather than having to generate a new snapshot when performing the data management operation for the directories/sub-directories, the most recently created snapshot 392, 394 for the specified backup group(s) 320, 330 that are still valid are utilized to perform the data management operation, e.g., the data backup operation or the like. The data management operation may target more than one backup group and thus, various snapshots 392, 394 for various backup groups 320, 330 may be used in accordance with their associated backup group names 362, 366 and backup group expirations 364, 368.

Thus, for example, if a backup operation is requested for a volume of data that includes both the backup groups 320 and 330, then the snapshots 392 associated with backup group 320 may be identified via the backup group name 362 and their associated expiration time 364 may also be identified based on the backup group name 362 associated with the backup group 320. The snapshots 392 may be examined in accordance with the expiration time 364 and a determination as to which snapshots 392 are still valid based on their timestamp, a current time, and the expiration time 364. Of those that are still valid based on these time values, a most recently created snapshot 392 that is still valid is used to perform the data management operation with regard to the backup group 320. The same operation can be performed with regard to backup group 330 with regard to snapshots 394 based on the backup group name 366 and backup group expiration 368.

With the mechanisms of the illustrative embodiments, data management operations can be performed using already existing snapshots such that the overhead associated with the creation of snapshots can be conserved with regard to data management operations in many cases. Moreover, by specifying expiration times for the snapshots with regard to their validity for use in being reused for subsequent data management operations, users are given greater control over the use of snapshots when performing data management operations. Furthermore, it should be appreciated that the environment variables specifying group names and expiration times may be applied regardless of which client devices or server devices have instigated the data management operation. Thus, snapshots can be reused between client computing devices, i.e. users, server computing devices, or the like. Therefore, for example, one user may specify a data backup operation that includes group 320 and another user may specify a data replication operation, or other data management operation, that also includes group 320 and the snapshot reuse may be performed with regard to both operations using the same snapshot 392 based on the same environment variables 362, 364.

The data management system 380, in addition to the environment variables 360 and the data management operation logic 370, provides snapshot generation logic 340 and snapshot deletion logic 350. The snapshot generation logic 340 determines when a new snapshot for a backup group 320, 330 needs to be generated and performs such generation of snapshots. The snapshot defection logic 350 determines when a snapshot for a backup group 320, 330 needs to be deleted. The data management operation logic 370 performs the actual data management operations including the determinations as to whether snapshots can be reused or not. These operations will be described in greater detail hereafter with regard to FIGS. 4-5.

Figure 4:
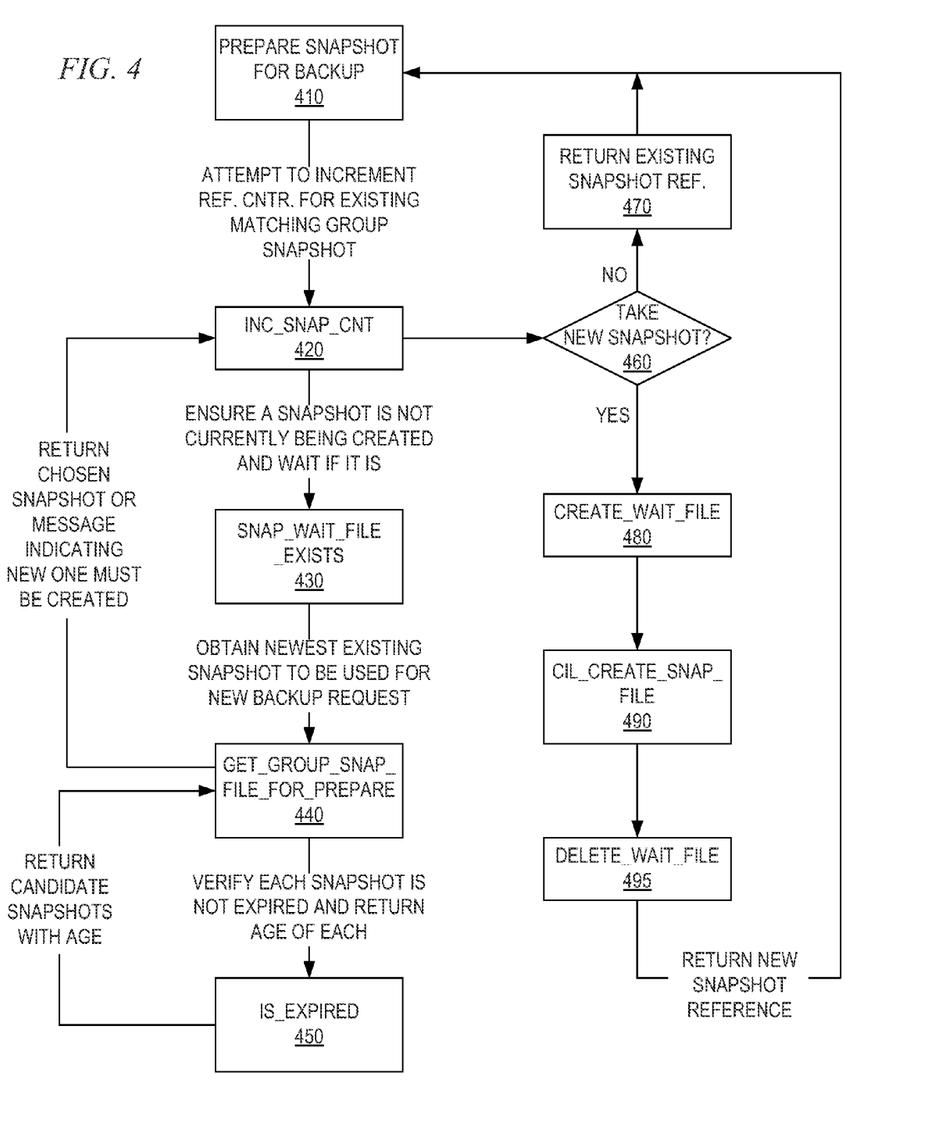
FIG. 4 is an outline of an example operation for creating a snapshot in accordance with one illustrative embodiment.

FIG. 4 is an outline of an example operation for creating a snapshot in accordance with one illustrative embodiment. The operation outlined in FIG. 4 may be performed, for example, by the snapshot generation logic 340 in FIG. 3.

As shown in FIG. 4, the operation starts with preparing a directory, or set of directories/sub-directories, for a data management operation, which in the depicted example is considered to be a backup operation (step 410). This function returns a path to the data management system that should be used for the backup operation. This function is actually comprised of two functions: (1) a function to prepare a directory for full backup, and (2) a function to prepare a directory for incremental backup. The first function for full backup receives as input, the identification of the directory or directories/sub-directories that are to be backed up, the backup group environment variable value, and the backup expiration environment variable value. The first function outputs a full path to the "prepared" directory, i.e. the copy of the directory within the snapshot. Similarly, the second function for incremental backup receives the directory or directories/sub-directories that are to be backed up, backup group environment variable value, and backup expiration environment variable value. In addition, the second function receives a timestamp of a previous backup. The second function outputs the full path to the "prepared" directory but also the path to the file containing a list of the files changed since the last backup time.

Having prepared the directory or directories/sub-directories for the backup operation, the data management system attempts to increment a reference counter for an existing matching group snapshot by calling a function incr_snap_cnt (step 420). The function incr_snap_cnt, which is called by one of the first or second function of the prepare directory for backup function of step 410, attempts to find an unexpired snapshot that can be reused for the file system/volume and a specified backup group name obtained from step 410. This function incr_snap_cnt receives a backup group name environment variable value, a backup expiration environment variable, and a file system mount point, i.e. a directory where a given file system begins and all subdirectories underneath that mount point are considered part of that file system. The function outputs a reference, e.g., address, file name and location, or the like, to a snapshot that can be reused rather than having to create another snapshot.

The incr_snap_cnt function calls a function snap_wait_file_exists (step 430) which checks to see if a temporary file exists for the directory or directories/sub-directories that informs other data management system processes that they need to wait for a snapshot to be created. The incr_snap_cnt function receives as an input parameter the mount point or starting address of the file system.

The incr_snap_cnt function further calls a function get_group_snap_file_for_prepare (step 440) after waiting, if necessary, for the snapshot to be created as determined by step 430. The get_group_snap_file_for_prepare function is used to find the corresponding snapshot tracking file that is the newest given the file system mount point of the file system containing the directory to be backed up and the snapshot group name. The snapshot tracking file with the lowest age will be returned to the calling function so that older snapshots will be used less and less if there are multiple snapshots for a given group. The get_group_snap_file_for_prepare function receives the mount point or starting address of the file system/volume and the backup group name environment variable value as input parameters, and outputs a snapshot tracking filename to use.

The get_group_snap_file_for_prepare function calls the is_expired function (step 450) to determine whether a snapshot has expired and returns the age of the snapshot. The is_expired function receives the snapshot file to be checked for expiration as an input and outputs the age of the snapshot. The get_group_snap_file_for_prepare function returns a chosen snapshot to the incr_snap_cnt function or a message indicating that a new snapshot needs to be created, e.g., in the event that no unexpired snapshots for the group can be found.

A determination is made as to whether a new snapshot of the file system containing the directory or directories/sub-directories is to be generated (step 460). If no unexpired snapshots exist, a new snapshot needs to be created (step 460: yes). If an unexpired snapshot exists (step 460: no), then the reference to the already existing unexpired snapshot is returned to the directory preparation function for use in preparing the backup (step 470). If a new snapshot is to be created, a function create_wait_file is called by the incr_snap_cnt function (step 480). The create_wait_file function creates a temporary file to let other data management system processes know that they need to wait for a snapshot to be created for the specified directory or directories/sub-directories.

The create_snap_file function is then called (step 490) which creates a snapshot counting file to start tracking how many data management system sessions are referencing the given snapshot. The create_snap_file function may be called, for example, by the get_group_snap_file_for_prepare function. This function receives the snapshot name, mount point or starting address, and initial number of data management system processes referencing the snapshot as inputs. The delete_wait_file function is then called (step 495) which deletes the temporary file that tells other data management system processes that they need to wait for a snapshot to be created. This function receives the file system mount point or starting address as input. The operation shown in FIG. 4 may be performed for each directory or group of directories/sub-directories that are the subject of a data management operation, such as a backup operation, replication operation, or the like.

Figure 5:
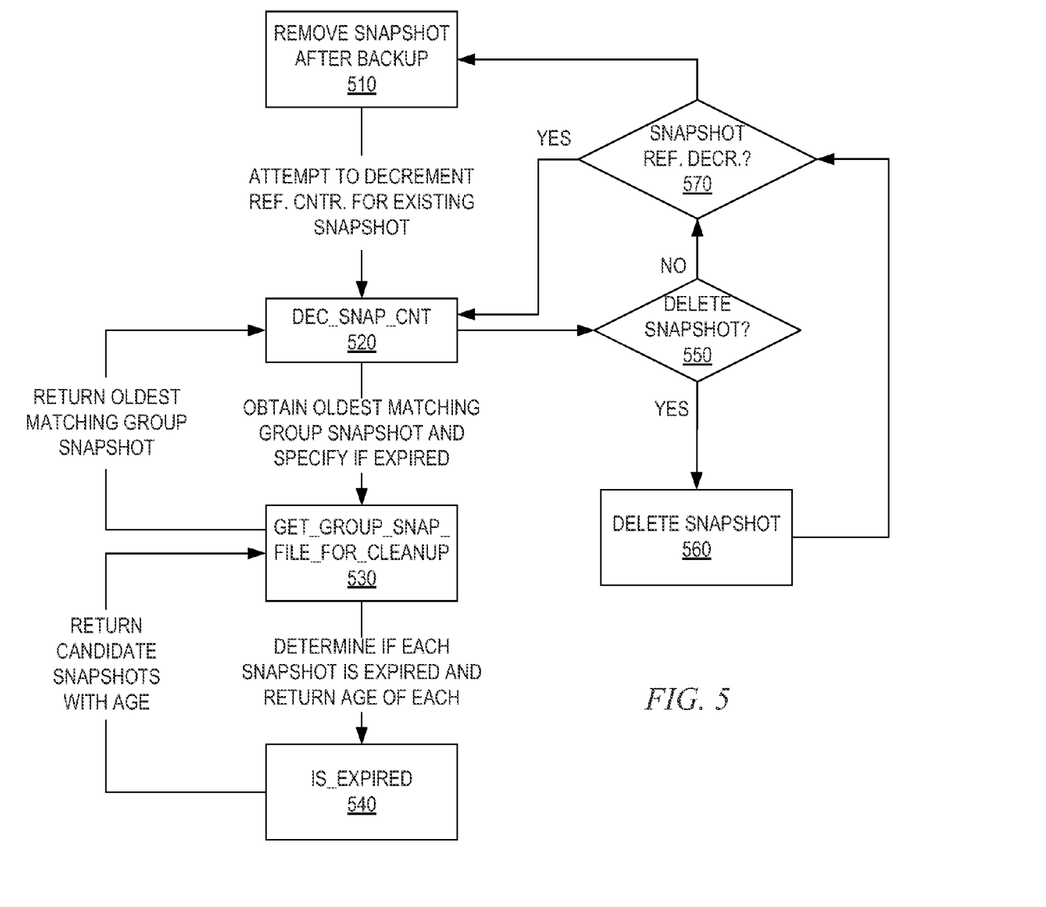
FIG. 5 is an outline of an example operation for deleting a snapshot in accordance with one illustrative embodiment.

FIG. 5 is an outline of an example operation for deleting a snapshot in accordance with one illustrative embodiment. As shown in FIG. 5, the operation starts with calling a clean up operation for removing a snapshot after a backup operation (step 510). The operation shown in FIG. 5 may be implemented, for example, by a cleanupDirAfterBackup function call. The cleanupDirAfterBackup function is used to perform any needed cleanup operation after a backup has been completed, including deleting the snapshot if necessary. The cleanupDirAfterBackup function receives the directory to be backed up and the full path to the "prepared" directory as input parameters.

The cleanupDirAfterBackup function calls the decr_snap_cnt function (step 520) which checks for a file located in the filesystem path mount point or starting address that is passed to it which records the number of references to an existing snapshot. If the file exists and contains a number larger than one, that number is decremented by one and 1 is returned (even if expired). If the file exists and contains a number equal to 1, and is expired, the tracking file is deleted, and 0 is returned so that the snapshot is deleted. If the file exists and contains a number equal to 0 and is expired, then the tracking file is deleted and 2 is returned. This function will be iteratively called again until a snap tracking file is found that can be decremented by one to account for the end of the data management system process. This function receives as input parameters the file system mount point or starting adddress and the full path to the "prepared" directory, and outputs the snapshot tracking filename to use.

The decr_snap_cnt function calls the get_group_snap_file_for_cleanup function (step 530). This is an internal function used to find the corresponding snapshot tracking file that is the oldest given the mount point or starting address and the prepared backup directory. The snapshot tracking file with the greatest age will be returned so that older snapshots are deleted before newer ones if there are multiple snapshots for a given group. This information may be obtained by calling the is_expired function (step 540). If a snapshot tracking file is found that has expired, a 1 is returned. If a snapshot tracking file is found that has not expired, a 0 is returned. This function receives the file system mount point or starting address and the full path of the "prepared" directory as input parameters and outputs the snapshot tracking filename to use. The get_group_snap_file_for_cleanup also calls the is_expired function as well.

If a snapshot tracking file is found that is expired, then a determination that the snapshot should be deleted is made (step 550: yes) and the corresponding snapshot is deleted (step 560). If a snapshot tracking file is found that has not expired, then a determination is made that the snapshot should not be deleted (step 550: no). In either case, a determination is made as to whether a snapshot reference was decremented (step 570). If not, then the operation returns to step 520 and we must repeat the process of finding another snapshot reference (step 530) that we can try to decrement. By iterating over snapshot tracking files until we are able to decrement a reference count, we are able to clean up any expired snapshots that no longer have any backup processes referencing them. If a snapshot reference was decremented, then the operation returns to step 510. The operation of FIG. 5 may be performed for each snapshot that is to be considered for deletion after performing the backup operation.

Figure 6:
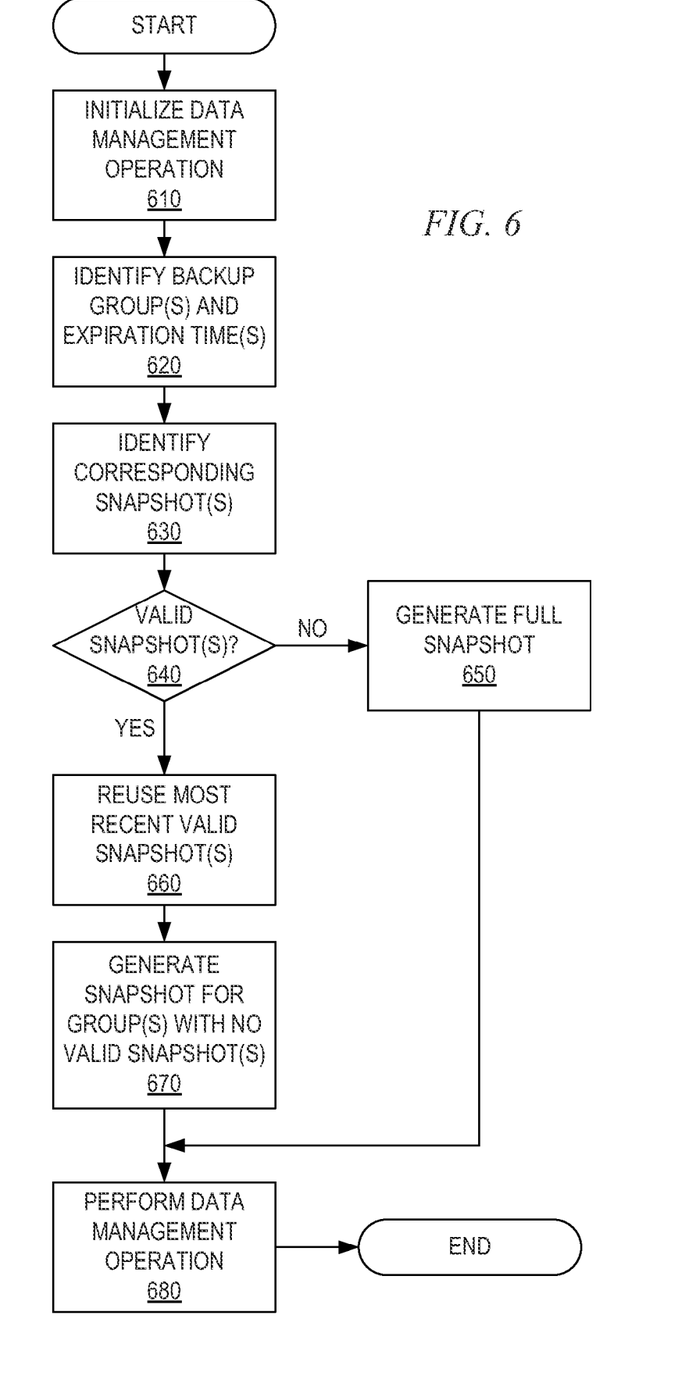
FIG. 6 is an outline of an example operation for performing a data management operation in accordance with one illustrative embodiment.

FIG. 6 is an outline of an example operation for performing a data management operation in accordance with one illustrative embodiment. As shown in FIG. 6, the operation starts with the initialization of a data management operation (step 610). The backup group(s) and expiration time(s) associated with the data management operation target are identified (step 620). Corresponding snapshots associated with the backup group(s) are identified (step 630). A determination is made as to whether there are any snapshots associated with the backup group(s) that are still valid and unexpired (step 640). If not, then a full new snapshot is generated (step 650). If so, then the most recently generated snapshots that are still unexpired, for each of the backup group(s) that are part of the data management operation are reused (step 660). If there are any backup group(s) for which there is not an unexpired snapshot available, then a new snapshot for that backup group or groups is generated and added to the snapshot for the data management operation (step 670). The data management operation is then performed using the identified existing snapshot(s) if any, and generated new snapshots, if any (step 680). The operation then terminates.

Thus, the illustrative embodiments provide mechanisms for defining backup groups and their associated expiration times. The illustrative embodiments further provide mechanisms for performing data management operations such that the data management operation reuses snapshots for backup groups in accordance with their expiration times. Thus, the overhead associated with the creation of snapshots may be avoided in many instances and users are given control over the reuse of snapshots by providing the ability to designate expiration times.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing data management operation comprising:
    identifying, by the data processing system, one or more defined groups of data elements that are a target of the data management operation;
    identifying, by the data processing system, one or more previously generated snapshot files associated with the one or more defined groups;
    determining, by the data processing system, whether at least one previously generated snapshot file of the one or more previously generated snapshot files associated with the one or more defined groups is able to be reused, wherein determining whether at least one previously generated snapshot file is able to be reused comprises:
        retrieving one or more expiration time variable values associated with the one or more defined groups of data elements;
        determining, for each previously generated snapshot file in the one or more previously generated snapshot files, whether the previously generated snapshot file is unexpired based on the retrieved one or more expiration time variable values associated with the one or more defined groups of data elements; and
        determining that a previously generated snapshot file in the one or more previously generated snapshot files is able to be reused in response to a determination that the previously generated snapshot file is unexpired based on the retrieved one or more expiration time variable values associated with the one or more defined groups of data elements; and
    performing, by the data processing system, the data management operation based on the determination of whether at least one previously generated snapshot file of the one or more previously generated snapshot files associated with the one or more defined groups is able to be reused.

2. The method of claim 1, wherein performing the data management operation comprises reusing the at least one previously generated snapshot file to perform the data management operation, in response to a determination that the at least one previously generated snapshot file is able to be reused.

3. The method of claim 2, wherein reusing the at least one previously generated snapshot file to perform the data management operation comprises using the at least one previously generated snapshot file, and not generating a new snapshot file for data elements that are part of the at least one previously generated snapshot file.

4. The method of claim 1, wherein the one or more defined groups of data elements are specified by one or more group environment variables identifying data elements associated with the environment variable as being part of a corresponding defined group in the one or more defined groups for data management operations, and wherein the retrieved one or more expiration time variable values associated with the one or more defined groups of data elements are specified by one or more expiration time environment variables associated with the one or more group environment variables.

5. The method of claim 1, wherein the one or more defined groups of data elements comprises a plurality of defined groups of data elements, and wherein each defined group of data elements in the plurality of defined groups of data elements has a different associated expiration time variable value.

6. The method of claim 1, wherein the one or more defined groups of data elements comprises one or more defined groups of directories in a file system of the data processing system or one or more other data processing systems.

7. The method of claim 6, wherein the data management operation is a network data management protocol (NDMP) backup operation for backing up the one or more defined groups of directories.

8. The method of claim 1, wherein the data management operation is a data replication operation for replicating the one or more data elements on mother data processing system.

9. The method of claim 1, wherein the at least one defined group of data elements are defined according to a file system of the data processing system or one or more other data processing systems, and wherein data management operations from a plurality of data processing systems operate on the file system using the same at least one defined group of data elements.

10. A computer program product comprising a non-transitory computer readable storage medium having a computer readable program stored therein, wherein the computer readable program, when executed on a computing device, causes the computing device to:
    identify one or more defined groups of data elements that are a target of the data management operation;
    identify one or more previously generated snapshot files associated with the one or more defined groups;
    determine whether at least one previously generated snapshot file of the one or more previously generated snapshot files associated with the one or more defined groups is able to be reused, wherein the computer readable program further causes the computing device to determine whether at least one previously generated snapshot file is able to be reused by:
        retrieving one or more expiration time variable values associated with the one or more defined groups of data elements;
        determining, for each previously generated snapshot file in the one or more previously generated snapshot files, whether the previously generated snapshot file is unexpired based on the retrieved one or more expiration time variable values associated with the one or more defined groups of data elements; and determining that a previously generated snapshot file in the one or more previously generated snapshot files is able to be reused in response to a determination that the previously generated snapshot file is unexpired based on the retrieved one or more expiration time variable values associated with the one or more defined groups of data elements; and perform the data management operation based on the determination of whether at least one previously generated snapshot file of the one or more previously generated snapshot files associated with the one or more defined groups is able to be reused.

11. The computer program product of claim 10, wherein the computer readable program further causes the computing device to perform the data management operation by reusing the at least one previously generated snapshot file to perform the data management operation, in response to a determination that the at least one previously generated snapshot file is able to be reused.

12. The computer program product of claim 11, wherein the computer readable program further causes the computing device to reuse the at least one previously generated snapshot file to perform the data management operation by using the at least one previously generated snapshot file, and not generating a new snapshot file for data elements that are part of the at least one previously generated snapshot file.

13. The computer program product of claim 10, wherein the one or more defined groups of data elements are specified by one or more group environment variables identifying data elements associated with the environment variable as being part of a corresponding defined group in the one or more defined groups for data management operations, and wherein the retrieved one or more expiration time variable values associated with the one or more defined groups of data elements are specified by one or more expiration time environment variables associated with the one or more group environment variables.

14. The computer program product of claim 10, wherein the one or more defined groups of data elements comprises a plurality of defined groups of data elements, and wherein each defined group of data elements in the plurality of defined groups of data elements has a different associated expiration time variable value.

15. The computer program product of claim 10, wherein the one or more defined groups of data elements comprises one or more defined groups of directories in a file system of the computing device or one or more other computing devices.

16. The computer program product of claim 15, wherein the data management operation is a network data management protocol (NDMP) backup operation for backing up the one or more defined groups of directories.

17. The computer program product of claim 10, wherein the data management operation is a data replication operation for replicating the one or more data elements on another computing device.

18. The computer program product of claim 10, wherein the at least one defined group of data elements are defined according to a file system of the computing device or one or more other computing devices, and wherein data management operations from a plurality of computing devices operate on the file system using the same at least one defined group of data elements.

19. An apparatus, comprising:
a processor; and
a memory coupled to the processor, wherein the memory comprises instructions which, when executed by the processor, cause the processor to:

identify one or more defined groups of data elements that are a target of the data management operation;

identify one or more previously generated snapshot files associated with the one or more defined groups;

determine whether at least one previously generated snapshot file of the one or more previously generated snapshot files associated with the one or more defined groups is able to be reused, wherein the instructions further cause the processor to determine whether at least one previously generated snapshot file is able to be reused by:

retrieving one or more expiration time variable values associated with the one or more defined groups of data elements;

determining, for each previously generated snapshot file in the one or more previously generated snapshot files, whether the previously generated snapshot file is unexpired based on the retrieved one or more expiration time variable values associated with the one or more defined groups of data elements; and determining that a previously generated snapshot file in the one or more previously generated snapshot files is able to be reused in response to a determination that the previously generated snapshot file is unexpired based on the retrieved one or more expiration time variable values associated with the one or more defined groups of data elements; and perform the data management operation based on the determination of whether at least one previously generated snapshot file of the one or more previously generated snapshot files associated with the one or more defined groups is able to be reused.

20. The apparatus of claim 19, wherein the instructions further cause the processor to perform the data management operation by reusing the at least one previously generated snapshot file to perform the data management operation, in response to a determination that the at least one previously generated snapshot file is able to be reused.

21. The apparatus of claim 20, wherein the instructions further cause the processor to reuse the at least one previously generated snapshot file to perform the data management operation by using the at least one previously generated snapshot file, and not generating a new snapshot file for data elements that are part of the at least one previously generated snapshot file.

22. The apparatus of claim 19, wherein the one or more defined groups of data elements are specified by one or more group environment variables identifying data elements associated with the environment variable as being part of a corresponding defined group in the one or more defined groups for data management operations, and wherein the retrieved one or more expiration time variable values associated with the one or more defined groups of data elements are specified by one or more expiration time environment variables associated with the one or more group environment variables.

23. The apparatus of claim 19, wherein the one or more defined groups of data elements comprises a plurality of defined groups of data elements, and wherein each defined group of data elements in the plurality of defined groups of data elements has a different associated expiration time variable value.

24. The apparatus of claim 19, wherein the one or more defined groups of data elements comprises one or more defined groups of directories in a file system of the computing device or one or more other computing devices.

25. The apparatus of claim 24, wherein the data management operation is a network data management protocol (NDMP) backup operation for backing up the one or more defined groups of directories.

* * * * *